Dec. 4, 1956   J. H. WAGGONER   2,772,603
FIBROUS STRUCTURES AND METHODS FOR MANUFACTURING SAME
Filed Sept. 12, 1950   3 Sheets-Sheet 1

Inventor:
Jack H. Waggoner
By Dawson & Ooms Attys:

Inventor:
Jack H Waggoner

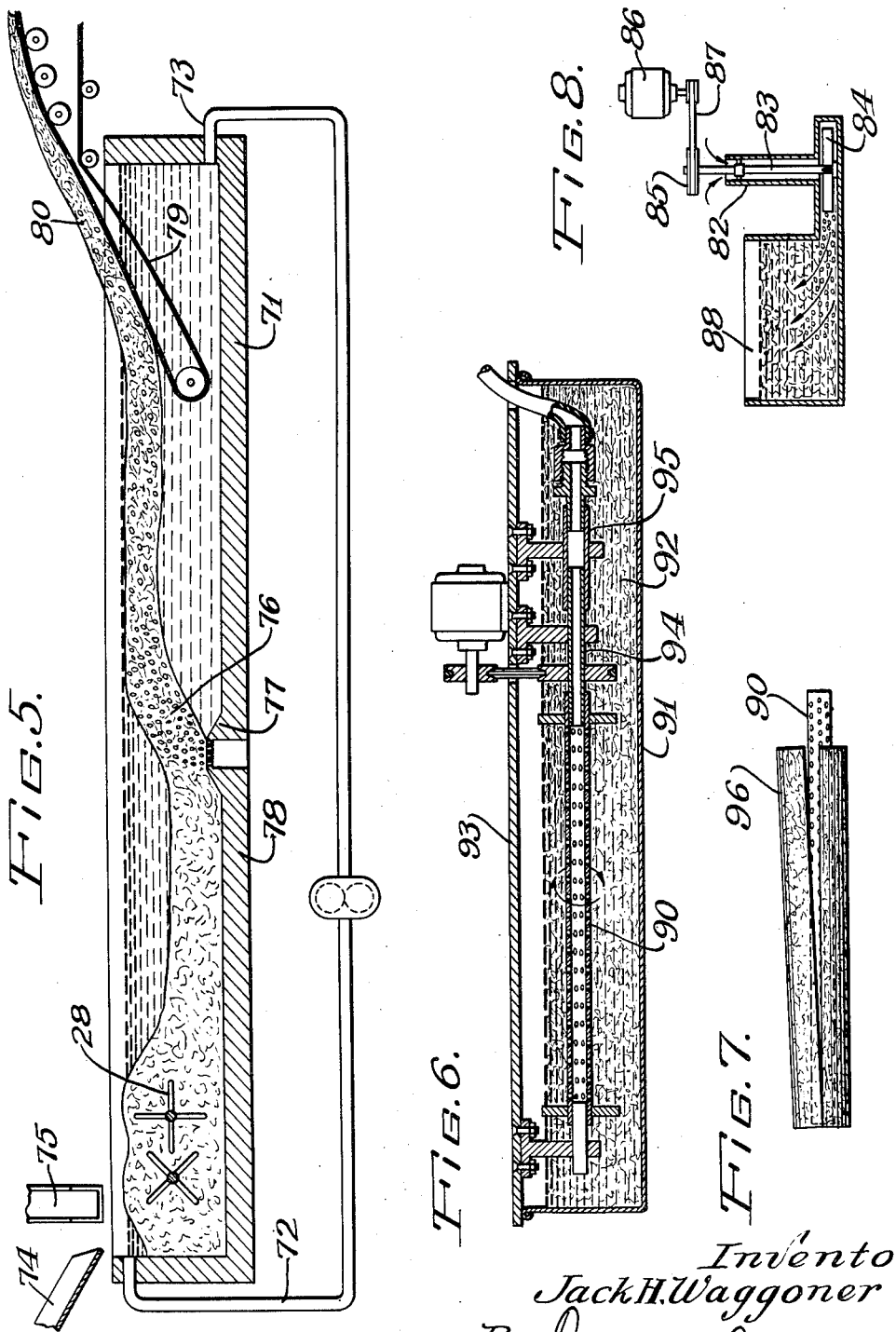

United States Patent Office 2,772,603
Patented Dec. 4, 1956

2,772,603

FIBROUS STRUCTURES AND METHODS FOR MANUFACTURING SAME

Jack H. Waggoner, Newark, Ohio, assignor to Owens-Corning Fiberglas Corporation, a corporation of Delaware Application September 12, 1950, Serial No. 184,355

5 Claims. (Cl. 92—39)

This invention relates to glass fiber products and particularly to the manufacture of thermal insulation, sound insulation, structural board, and fibrous sheets which may be used as such or in the manufacture of laminates, mats and bats and the like, and in which glass fibers constitute the major constituent. This invention also contemplates the use of other fibers which have some of the characteristics of glass fibers, such, for example, as fibers drawn from synthetic resins.

The use of attenuated fiber of glass or synthetic resin in the manufacture of fibrous structures is faced by the difficulty of integrating or otherwise forming the glass fibers into a self-sufficient mass. This is because the glass fibers and the like exist in the form of rod-like filaments of substantial length having little, if any, crimp or curl and having perfectly smooth rounded surfaces. There is nothing on the glass fiber surfaces which might cause the fibers to cling together upon contact with one another, and, therefore, it is difficult to felt the fibers into a self-sufficient mass. Because of the smooth, nonporous nature of the glass fiber surfaces coupled with their hydrophobic characteristics, it is difficult to bond resinous materials or other adhesive to the glass fiber surfaces for the purpose of integrating the fibers one with another. Although these properties may be used to advantage in some applications, they detract from or impair the assembly of the fibers into fibrous structures having a high degree of mass integrity.

By way of comparison, other common natural fibers, such as wool, cotton and the cellulose fibers, have their surfaces covered with a large number of tiny fingers or hairy projections which apparently cause the fibers to cling to one another upon contact. This agglomerating or combining characteristic permits felting together in a dry state or from liquid suspension to form fibrous structures of considerable strength. In fibrous structures of this type, it is often unnecessary to make use of additional binder in the form of resinous materials or the like to achieve strength sufficient for the purpose for which the structure is intended.

On the other hand, the inability of glass fibers and the like to interfelt into a mass with sufficient strength and integrity to resist forces to which it might be exposed as an incidence to normal handling, makes it necessary to incorporate binders or cements to gain a limited degree of bond between the fibers, whether in the form of a mass, web, yarn, strand or other preformed body.

Aside from the usual high cost of the adhesive or binder and its application, it has often been found necessary to employ such large amounts of binder in order to effect a desired degree of mass integrity that other desirable properties of the structure are handicapped. For example, most organic materials which might be used as binder compositions begin to decompose by thermal reaction upon exposure to temperatures of 400° to 500° F. so that products in which they are embodied are limited to low temperature applications. This is important because, in the absence of such organic binder, heat insulation formed of glass fibers could be subjected to temperatures in excess of 1000° F. without harm to the fibers or the structure. More important by way of further illustration, high concentrations of resinous material, such as phenol-formaldehyde, so stiffens and embrittles the glass fiber mass that it detracts from its acceptability as an insulation or textile product. It reduces its recovery and also greatly reduces its tear and strength properties.

Attempts have been made to make use of inorganic binder compositions, such as bentonite and other clays, for the purpose of maintaining the inorganic character of the final product while gaining the benefit of the mass integrity imparted by the use of such binder compositions. While binding materials such as these are resistant to high temperatures, they exhibit high attraction for moisture and are hygroscopic, and since it is the usual practice to apply such compositions in aqueous medium, removal of the diluent and the moisture combined in the binder material requires considerable heat treatment. In clay systems, it is necessary to use as much as 15 percent by weight bentonite or the like. Such amounts cause gellation in the fibrous structure upon formation with aqueous medium and it is practically impossible to achieve proper ventilation for the removal of water at a rapid rate during the final steps in manufacture. Reliance must be had upon surface evaporation, which is slow and expensive. Furthermore, the presence of such large amounts of clay results in a product which is dusty, brittle and friable and therefore limited in application as well as flexural strength and tear strength.

It is an object of this invention to produce a fibrous structure of attenuated glass or synthetic resinous fibers and the like having high mass integrity with little, if any, adhesive, and it is a related object to provide methods for producing same.

Another object is to produce glass fiber structures of glass fiber modified in its surface characteristics to cause the fiber to cling together in the formation of a felted mass having high integrity and which may be markedly increased in strength thereafter by the incorporation of a minimum amount of resinous binder, and it is a related object to provide a method for producing same.

A further object is to produce glass fiber products in which the fibers may be formed into a self-sufficient mass of high strength by the use of a bonding agent that does not detract from the use of the finished article for purposes of the type described.

A still further object is to produce a fibrous product of the type described employing a small amount of a binding agent which is fibrous in character, and it is a related object to produce a fibrous structure of the type described in which the binding agent operates flexibly to space the glass fibers one from another to increase flexibility and reduce the possibility of self-destruction by mutual abrasion.

A basic object is to combine attenuated glass fiber with felt bonding fibers which become associated or orientated with the glass fibers to enable the arrangement thereof into a structure having high mass integrity and which protects the glass fiber surfaces against abrasion of the type which has heretofore limited the use of glass fiber in textiles, mats, or batts.

A still further object is to produce a glass fiber product of the type described in which the binding agent consists chiefly of a fibrous material which is present in such small quantities as to permit the product to retain practically all of the original characteristics of the glass fibers, such as flame-proofness, heat resistance, and resistance to exposure at high temperature.

A still further object is to produce glass fiber products of the type described which may be varied in density from below three pounds per cubic foot to thirty pounds per cubic foot (or more) and which may be further treated or impregnated with the usual resinous materials to produce a product having new and improved characteristics.

A still further object is to produce a glass fiber product of the type described which employs a new and improved binding agent to produce a product having high strength and mass integrity without the necessity of employing organic or inorganic adhesives of the usual type.

A still further object is to produce fibrous insulation and structural boards and other preformed shapes characterized by high temperature resistance, incombustibility, high tensile strength, high flexure and impact strength, and nail holding ability while having sufficient porosity to serve as sound and thermal insulation, and it is a related object to provide new and improved processes for manufacturing same.

An object of this invention is to provide an improved binder system for glass fiber products and to provide new processes making use of same in the manufacture of fibrous structures.

A still further object is to produce and to provide a method for producing a bonded fibrous structure having microscopic bubbles or voids arranged in substantially uniform distribution adjacent the glass fiber surfaces to achieve the properties of a highly bulked-up glass fiber structure with minimum concentration of binding agent.

A still further object is to produce a porous glass fiber structure embodying expanded or puffed mineral as a bulking agent to increase porosity without detracting from the other properties of the fibrous structure.

A still further object is to produce and to provide a method for producing a fibrous structure loaded with microscopic bubbles and to employ ultrasonic and supersonic vibration in the manufacture of same.

These and other objects and advantages of this invention will hereinafter appear and for purposes of illustration, but not of limitation, embodiments of this invention are shown in the accompanying drawings, in which:

Figure 5 is a schematic view of apparatus for manufacturing bubble filled fibrous products embodying features of this invention;

Figure 6 is a schematic view of a technique for manufacturing tubing embodying concepts of this invention;

Figure 7 is a further view showing a step in the manufacture of tubing; and

Figure 8 is a schematic view of another apparatus for manufacturing bubble filled fibrous products embodying features of this invention.

Figure 1:
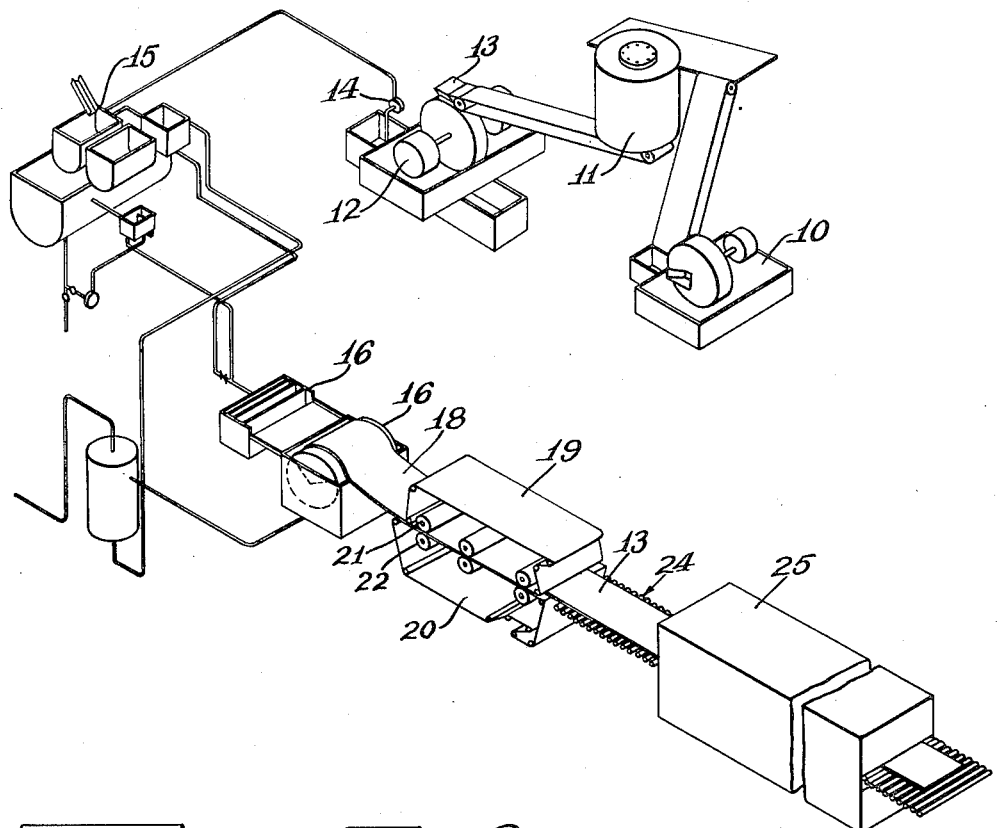
Figure 1 is a schematic view of one system for manufacturing fibrous structures embodying features of this invention.

As used herein, the term "binder fibers" relates to fibers having large numbers of fuzzy ends, hairs or flexible fingers extending from the sides which cause the fibers to cling to each other and interlock upon contact, especially after being felted from a highly dispersed condition and then dried. Characteristics such as these are exhibited by natural fibers such as cellulosic fibers derived from wood, paper pulp, cotton, corn stalks, sisal, hemp, and the like, and from inorganic fibers such as asbestos fibers of the type amosite, chrysotile and materials of the type Paligorskite, commonly known as "mountain leather." Use as a binder fiber may also be made of synthetic fibrous minerals such as rock wool, synthetic asbestos fibers and the like, and even glass under certain circumstances which will hereinafter be described. Although for many purposes such fibers may be usable interchangeably or in combination with each other for binding purposes in accordance with the concepts of this invention, there are situations wherein such substitution cannot be made because the process is applicable only to asbestos type fibers or the like or to cellulose pulp fibers, or the like, as will hereinafter be developed.

The term "glass fibers," as used herein, is meant to include glass fibers of the staple or wool type, such as are attenuated from molten streams of glass by reaction with high pressure air or steam. Included also are continuous fibers mechanically drawn at high speed from streams of molten glass and which may cut to desired lengths for manufacture of fibrous structures embodying the concepts of this invention. It has been found that structures embodying features of this invention may be prepared of glass fibers of considerable length or of relatively short length, and that very often most satisfactory results are secured by the use of glass fiber having considerable variation in length between long to very short fibers of a few microns in length. Glass fibers of the type described may be used in the condition in which they are delivered from the fiber forming unit—that is, with or without lubricant or size thereon, but it is preferred to remove the size or coating prior to use in the formation of fibrous structures in accordance with this invention. Porous and bonded mats or batts of glass fibers may also be used to form structures having new and improved characteristics embodying features of this invention, as will hereinafter be described.

A basic concept of this invention resides in the orientation of binder fibers in small proportion with the glass fiber surfaces whereby the fibers together are able to form into a felted mass and interlock in a manner to provide sufficient strength to resist forces incident to normal handling and use. The desirable properties of the glass still remain in that the structure is substantially incapable of combustion, it is able to resist temperatures in excess of 1000° F., it has high strength, it rot-proof, vermin-proof, and substantially inert, and is admirably adapted for use as sound insulation, heat insulation, resinous reinforcement, coated fabrics, textile fabrics, and the like. The desirable properties of the small amount of binder fibers are clearly evident in that the fibers in the structure cling to each other strongly.

The reasons why such small amount of binder fibers are able to impart the desired results have not yet been fully developed. It appears, however, upon examination, that the glass fiber surfaces become covered substantially throughout with the felt binding fibers and become so well integrated with the glass fiber surfaces as to appear as a part thereof and impart felt bonding characteristics thereto.

The forces by which the binder pulp fibers integrate with the glass fiber surfaces appear to be greater than that which results from merely felting out the pulp fibers onto the glass fiber surfaces. In addition, the coverage of the glass fiber surfaces with what appears almost as a monomolecular layer of the pulp fibers substantiates the concept that the pulp fibers, such as kraft fibers, carry a negative charge (anionic), while portions of the glass fiber surfaces remain positively charged (cationic), whereby a type of ionic bond forms between the kraft and glass fibers—the like charges in the kraft pulp fibers causing the fibers to repel each other in aqueous dispersion and to be strongly attracted to the glass fiber surfaces until the charges thereon are substantially completely satisfied upon deposition of a layer of binder fibers thereon. Thus physical-chemical forces are involved in the original orientation of the colloidal pulp fibers with the glass fiber surfaces to the end that the glass fibers are substantially completely covered with a small amount, compared to the weight of the glass fibers, of binder pulp fibers. The glass fiber so modified is capable of felting in the manner of the pulp fibers disposed thereon. This is evidenced by the fact that a small percentages of colored pulp fibers, less than 5 percent by weight of the glass fibers, are able to cover the glass fibers so complete throughout when deposited from dilute aqueous solution and dried that the glass fiber appears to be of the same color throughout and becomes invisible per se by the naked eye. For example, when 10 parts of a yellow pulp fiber was mixed with 1000 parts of water and 90 parts by weight of glass fiber was mixed with 20,000 parts by weight water and the two dispersions combined, the fine pulp fibers begin to bond and felt all over the glass fiber surfaces to impart to them the same color and the characteristics of the felt binder fibers. These pulp fibers arrange themselves all around the glass fibers and thereby enable the glass fibers so coated to felt together into a fibrous structure of high mass integrity.

For best operation, it is desirable to so thinly disperse the pulp binder fibers in the aqueous medium that they are able freely to move about and float away from each other. The separation of the pulp fibers is encouraged by the ionic forces which cause them to repel each other while binding with the glass fiber surfaces is encouraged throughout by the attraction that exists between unlike charges.

It appears that upon drying, some shrinkage occurs as the pulp fibers form into a porous interfelted network about the glass fibers, whereby the pulp fibers retreat in part to the glass fiber intersections. Thus the dried pulp fibers concentrate at the glass fiber intersections where they are more ably adapted to achieve their interbonding function. It appears further that the highly dispersed network of pulp fibers lose their colloidal properties and shrink to an open but tangled mass completely interlocked with the glass fibers. At the same time, the network of glass fibers keep the fibrous structure from shinking to a higher bulk density in the absence of compression. The pulp fibers integrated all around the glass fiber surfaces and especially at the glass fiber intersections operate not only to tie the glass fibers together but also maintain a desired spaced relation between them. In this way the abrasive effect, such as mutual abrasion, is greatly reduced to make the felted fabric particularly useful in the textile art.

Microscopic examination reveals the presence of pulp fiber nests at the points of intersection between glass fibers in the endproduct. These concentrations at glass fiber intersections may result, in part, from the reactions described above, but the amount indicates a further settling as by felting, filtration or merely settling out at points of glass fiber contact where the presence of such high concentrations greatly benefit the characteristics of the final product. They not only provide greater bond where it will be most effective, but they function as spacers more fully to separate the fibers in the fabric and protect the fibers from destruction by mutual abrasion. This, in part, is responsible for the greater flexibility of the fibrous structure.

Though mass integrity flows from the practice of the invention as described, it has also been found that a small amount of resin may be used in addition greatly to increase the strength far beyond that which results from the use of an equivalent amount of resin in ordinary glass fiber or felted fibrous structures.

The length of the glass fiber is not controlling except for the understanding that strength generally is in proportion to length and, as previously pointed out, highest strength results from the use of glass fibers which vary in length from very short to fairly long. It is best if the pulp binder fibers are reduced to the smallest length possible. Lengths less than 1/16 inches may be used but the amount that is necessary is directly proportional to length. Similarly, equivalent strength results from the use of less pulp fiber which has been more finely pulped.

It has been found sufficient if the amount of pulp or binder fibers present in the fibrous structure constitutes as little as 3 percent by weight, but best results are secured when used in amounts ranging from 5–15 percent pulp fibers of the cellulose type or 15–25 percent of the asbestos type. When cellulose type fibers are used in amounts set forth, the resulting fibrous structure retains the high temperature resistance and the flame-proofing characteristic of glass fibers. When asbestos constitutes the binding medium, the resulting structure is not only flame-proof but it is unaffected when exposed to temperatures as high as 1200° F., or more. Very desirable structures can be manufactured with pulp binder fibers present in amounts ranging as high as 30 percent by weight, but further amounts of pulp fiber seemingly have a deleterious effect upon the strength, heat resistance, and electrical insulation characteristics of the resulting fibrous structure.

For example, 5 percent of highly pulped kraft fiber (about 1–10 microns) is just as effective as a binder in the manufacture of a fibrous structure as 8 percent of such fibers which have not been pulped to as great an extent (about 1/64 inches). The difficulty encountered with the use of highly pulped fibers resides in the "freeness" of the form fiber structure. This relates to the ability rapidly to remove the aqueous medium from the mass formed upon separation of the fibers from suspension. When the binder fibers are used in the amounts described, freeness or elimination of the water from the deposited fibrous structure does not present a problem because it is possible to suck hot air through the deposited fibrous structure so that drying can be effected in relatively short time. In this manner moisture can be eliminated and the product dried in a matter of 5–15 minutes.

Particular importance is attributed to the fact that the longer and comparatively coarser glass fibers maintain sufficient spacing in the fibrous mass to permit the major portion of the free water to drain while leaving an open structure through which air can be drawn to accelerate evaporation of the remaining water. The air can be heated further to reduce the drying time. By way of comparison, when clay binder systems are used, the highly gelatinous character of the clays causes the fibrous structure to become completely plugged so that internal ventilation is substantially impossible. This is true with clay contents even as low as 8 to 10 percent by weight. As will hereinafter be described, clay may be incorporated as an ingredient in fibrous structures embodying features of this invention, primarily for the purpose of improving flame-proofness, but in that event, the predominance of the glass and pulp fibers still provides for an open structure.

Excellent results are secured by the use of pulped newsprint as the binding medium because the lignin, the natural binder in the cellulose product, remains and is able to function as a binding agent, especially after heating. When kraft pulp fibers are used from which lignin has been removed, improved results are secured if the lignin is later replaced by incorporating with the natural cellulose binder in the aqueous slurry or by incorporating the lignin in the formed fibrous structure. It appears that the lignin incorporated in this manner concentrates at the fiber intersections where it is better able to function for the purposes for which it is intended. It will be understood that when other pulp fibers of the type described are embodied as the binding material, lignin as well as other resinous material may be used to improve the strength properties of the fiber structure as hereinafter will be described.

The following examples are illustrative of typical formulations embodying concepts of the invention so far described:

*Example 1*

0.12 pounds kraft pulp (6% fiber in aqueous medium)
4 pounds white wool glass fiber
132 pounds water This formulation results in the manufacture of a fibrous structure having about 3.3 percent pulp fiber and 96.7 percent glass fiber. The fibrous structure has excellent strength, especially in the lengthwise direction, and is able to serve as a structural board when compressed sufficiently, as will be described.

*Example 2*

10 parts by weight pulped kraft fiber
140 parts by weight continuous glass fibers cut to short lengths
4000 parts by weight water

*Example 3*

10 parts by weight asbestos pulp waste
50 parts by weight glass fiber
Water in amount to make up 2% concentration of fiber in the dispersion

*Example 4*

10 parts by weight Paligorskite
40 parts by weight glass wool fibers
Water to make up about 0.3% dispersion

*Example 5*

10 parts by weight kraft pulp
4 parts by weight lignin
150 parts by weight continuous fiber cut to ½ inch lengths
50,000 parts by weight water The systems which will now be described illustrate various inventive concepts which may be used to manufacture fibrous structures with formulations of the type described.

*Example 6*

As shown in Figure 1, kraft fibers or newsprint of the type employed in Examples 1 and 2, may be reduced to small dimension in the shredder 10. The shredded fibers are fed into a digester 11 in advance of their being fed into a pulper 12 by which the fibers are further reduced in dimension and are formed into a slurry with water admitted through inlet 13. The slurry is advanced by pump 14 to a mixing tank 15 into which the glass fibers are fed in the desired proportion along with additional water and steam for the purpose of creating sufficient agitation for mixing purposes. From the mixing tanks 15, the suspension of pulp fibers and glass fibers may be fed into a head box 16 in advance of an Oliver type rotary filter 17 which separates fibers on a peripheral surface to form a felted sheet 18 which may continuously stripped therefrom as the water is drained through the wall and into a suction box.

The formed sheet 18 may be passed directly through a drying area for the purpose of eliminating the remaining moisture, but when it is desired to form board or sheet stock of relatively high density, it is best to pass the formed fibrous layer between cooperating endless belts 19 and 20 which, in cooperation with rollers 21 and 22, compress the layers therebetween before or during the drying process. Upon leaving the compression area, the board 23 is advanced along rollers 24 or other conveying means through a drying oven 25 for the purpose of driving off more of the remaining moisture.

Drying may be carried out quite rapidly at temperatures between 250° and 450° F., depending upon the type of circulation therein and the thickness and density of the fiber structure. When the air is merely circulated about a board one-half to three-fourth inch thick, it may be dried in about one hour. However, if the hot air is drawn through the board, drying may be completed in as little as ten minutes.

*Example 7*

Figure 2:
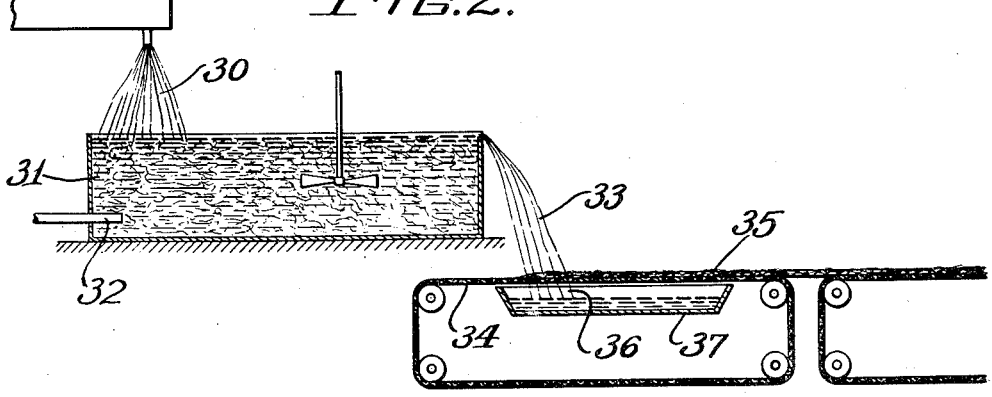
Figure 2 is a schematic view of another process for carrying out this invention.

In another method, shown in Figure 2, a formulation such as that given in Example 4, may be used. In this process, glass fibers 30 are fed directly from a fiber forming unit into a mixing tank 31 having an inlet 32 through which the slurry of pulp fibers is admitted. The materials are kept under constant agitation by a suitable mixer and the overflow 33 spills onto a foraminous member, such as an endless screen or belt 34 which separates out the fibers on the surface thereof to form their desired felted sheet 35 while permitting the water 36 to drain therethrough. The drainage of the water may be assisted by a suction box 37 located below the binder, whereby a greater proportion of the water is withdrawn from the felted mass. Without suction, water in equal proportion to fiber may remain, but with suction, the moisture content may be reduced to 50–75 percent of the fiber.

The formed fiber structure may be densified by co-acting members, as previously described in connection with the foregoing example, or it may be fed directly into the drying oven maintained at a temperature in the range of 300–1000° F., since organic constituents are absent.

The product secured by the practice of this phase of the invention has relatively high strength even when the interlocking fibrous material is present in amounts as small as 15 percent by weight. The structure does not support combustion and it is not changed by exposure to temperatures as high as 1250° F.

*Example 8*

Figure 3:
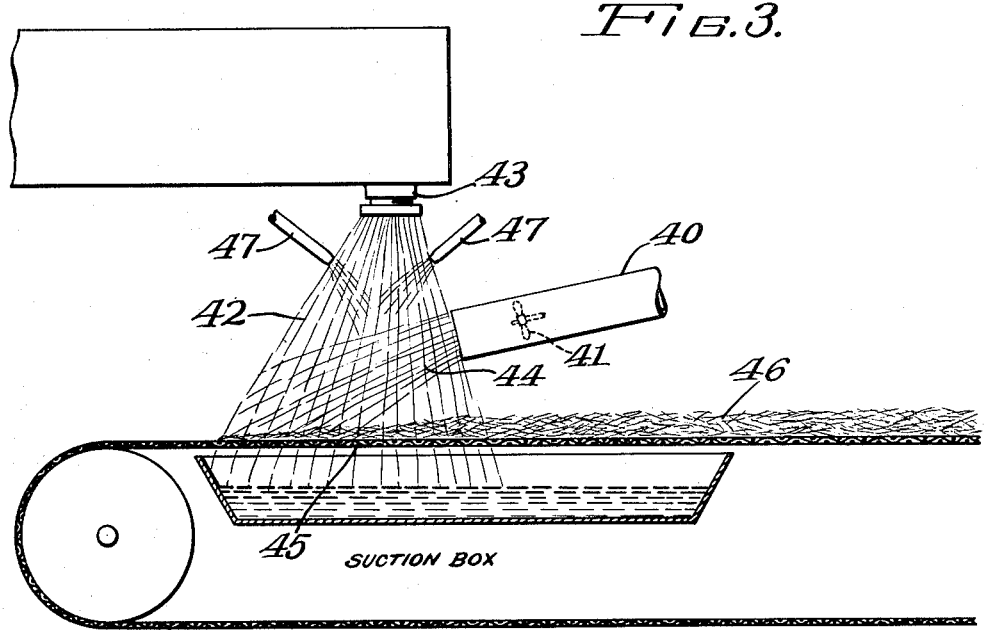
Figure 3 is a schematic view of another set-up for carrying out this invention.

In a still further modification illustrated in Figure 3, finely powdered binder fibers of the asbestos or cellulose type may be fed in desired concentration through conduit 40 and blown by propeller 41 into the path of staple glass fibers 42 which are rained down from above. The glass fibers may be fed directly from the glass forming unit 43 and may be joined by the pulp fibers 44 in a conventional forming hood. It is desirable thoroughly to wet the fibers in association in order to enable the aforementioned ionic forces to have effect for full orientation. Such moisture may be incorporated into the forming hood 44 as a spray from nozzle 47, or else the deposited dry fibrous structure may be flow coated or fully submerged in a water bath. The mixture of fibers are deposited in felting arrangement on a conveyor belt such as a member 45, through which the water drains. In the event that greater densification is desired, the layer may be fed through compacting rollers or the like while drying.

In a system of the type described, binder resins or adhesives may be sprayed into the forming hood for admixture with the fibrous materials in the event that greater strength is desired in the fibrous structure. Such binder materials may be activated under heat and pressure after formation of the fibrous structure, that is, during drying or in a separate molding step. Instead of incorporating binder or adhesives at this stage of the forming process, they may be subsequently applied, as, for example, by spraying onto the collecting fibers while or after they are separated on the screening wall.

Still greater fiber orientation and other improvements are secured when the binder fibers are injected as a slurry sprayed onto the fibers in the forming hood. In the event that such technique is employed, binders, if any, may likewise be incorporated in solvent or aqueous medium in the forming hood or onto the collecting layer of fibers.

*Example 9*

Figure 4:
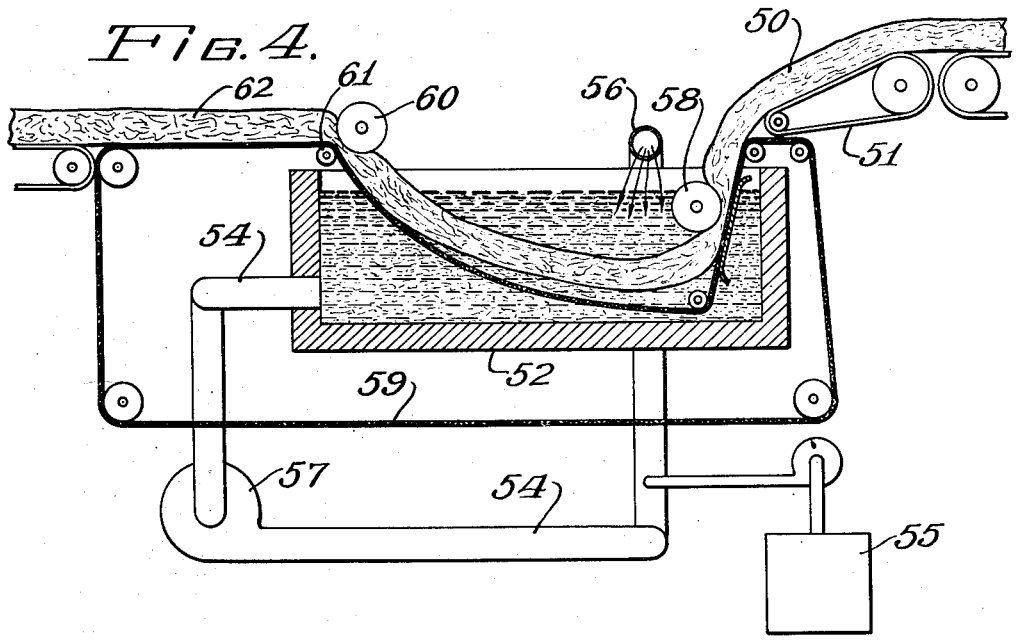
Figure 4 is a schematic view of a still further technique which may be used in the practice of this invention.

A still further method which may be used in the practice of this invention is schematically illustrated in Figure 4 of the drawing. In this system, the desired amount of glass wool with or without binder or size is fed continuously as a felted web 50 along a conveyor 51 into a tank 52 containing a slurry 53 of the pulp fibers in the ratio described. The slurry is kept under constant agitation in the tank so as to keep the pulp fibers in uniform distribution by recirculating the slurry from the underside of the tank through conduits 54 and 55 to readmit the slurry with any makeup admitted from reservoir 55 through an inlet 56 in the upper region of the tank. Such circulation generated by pump 57 also causes the slurry to pass through the layer of wool fibers as they are submerged by rollers 58 and carried lengthwise through the tank along an endless conveyor 59. Such forced circulation of the slurry through the web of glass fibers insures the infiltration of the pulp into the innermost regions of the fibrous layer so as to enable the pulp fibers to become fully oriented and cover the glass fiber surfaces and concentrate at the intersections for better binding purposes. In the treatment of white wool fibers, such as this, it is best to make use of dispersing agents such as will hereinafter be described to enhance penetration and minimize filtering out the pulp fiber on the wool mass. It is still better to make use of materials which increase the penetrating characteristics of the slurry, such, for example, as the flocculating agents or like substances which seem to eliminate, temporarily, the fibrous nature of the pulp fibers united deflocculated, as will also be described hereinafter.

Excess slurry and water is expressed between squeeze rolls 60 and 61 as the fibrous mass is carried out of the tank by the conveyor 59. The fibrous layer 62 thus formed may be advanced to compressing means for densification or else may be advanced directly to a drying oven or other processing elements.

It has been found that intaglio and raised designs may be permanently formed in the fiber structure by depositing the fibers or by compressing the fibrous layer during drying on a correspondingly contoured surface. Instead, the fibrous structure may be formed between plates to have such raised or grooved designs so long as about 1-3 percent free moisture remains in the final product. Other shapes may also be formed as an incidence to the manufacture of the fibrous structure or afterwards so long as the desired amount of moisture is present. For example, compressed boards may be formed with grooves in one end and tongues in the other which interfit to establish a desired relation.

It has also been found that the density of the formed structure can be increased when desired or the incombustibility and heat resistance of the fiber structure may be improved, or both characteristics may be achieved at the same time by the introduction of colloidal or finely-divided inorganic substances into the bonded fibrous structure. Such inorganic loading agents may be formulated as a constituent of the fibrous suspension for use in the formation of the fibrous layer, or they may be separately introduced later. For such purposes, use may be made of inorganic loading agents such as phosphate clays, china clay, bentonite, colloidal metallic oxides, expanded perlite, exfoliated vermiculite, diatomaceous earth, finely divided glass fibers, dicalite, silica and the like. Densities in the range of 10 to 30 pounds per cubic foot may be achieved in the fibrous structure, depending upon the concentration of the loading agent and the amount of compression of the fibrous layer during drying. Without a loading agent it is difficult to achieve specific gravities higher than 30 pounds per cubic foot. With the use of expanded minerals of the type described, reduced combustibility is achieved coupled with reduction in density of the type desired in insulation materials. Fibrous structures having as much as 10 percent organic pulp binder fibers and loaded with inorganic particles of the type described are able to withstand extended exposure at elevated temperatures, with asbestos pulp, exposure may be at temperatures as high as 1400° F. Color of a prominent character may be embodied in the formed fibrous structure by judicial selection of metal oxides, such color systems are especially desirable because of their permanent character and the ability to gain uniform distribution of the coloring particles throughout the fibrous mass so that depth of color and color intensity can be achieved.

One of the difficulties encountered in the manufacture of the fibrous structures of the type described resides in the inability always to maintain a uniform dispersion of the pulp and glass fibers. Settling out or nonuniform distribution tends to take place, especially when cellulosic and glass fiber mixtures are used. It has been found that the stability of the dispersion may be greatly increased by the addition of finely divided loading agents, especially the clay or earth minerals. These tend to aid the dispersion and cause better distribution of the materials in the separated fibrous layer. When the pulp fibers are to be added into already formed glass fiber layers or fibrous structures of the type described, the presence of such inorganic dispersion agents permits fuller penetration with minimum separation on the surface of the felted structure. For this purpose, from 1 to 5 percent dispersing agent is satisfactory, but more may be used since the entire quantity may also serve as a bulking or loading agent as described. As a loading or bulking agent, up to 30 or 40 percent finds beneficial use, especially with organic binder fibers to reduce their combustibility and to increase density.

It has also been found that organic-inorganic compounds which may be formed of these inorganic loading materials function in a manner to improve the dispersion and distribution of particles while in the wet stage and are thereafter able to function as a binding agent for the glass fibers after the felted mass has been formed. An example of this concept is in the use of amino bentonites. In its natural form, the amine bentonite, preferably in amounts up to 10 percent by weight, functions as a dispersing agent in aqueous system and as a binder upon drying. Materials of this type might also function as a binding agent when the organic group is driven off, leaving nascent bentonite particles integrated with the glass fiber composition. Such systems are used to advantage with either asbestos or cellulosic pulp fibers.

Although stresses sufficient to maintain considerable weight are secured in fibrous structures of the type described, it is often desirable to achieve still greater mass integrity and strength, especially in the direction which is crosswise of the direction in which most of the fibers are oriented upon separation from aqueous suspension upon a moving belt. For this purpose, additions are made of suitable resinous binder incorporated with the fibers in the slurry or after the fibers have been deposited. If the resinous materials are incapable of adhesion in the manner incorporated, such as when they are applied as solid particles in the dispersing phase, bonding characteristics may be developed by subsequent heat treatments, such as in the drying operation or by a special treatment between heated members.

The binder particles preferentially become lodged within the nests formed of the pulp fibers at the glass fiber intersections and over the surface of the fibers. Such concentrations in this area and the novel arrangement of fibers already bonded, permits the use of considerably less binder or enables more effective use of the binder that is used without detracting from the structure. The pulp fibers located over the surface of the glass fibers enables substantial coating of the fibers throughout their length. Organic binder materials may be used such as thermoplastic resins of the type polystyrene, polymethylmethacrylate, and other polycrylates, polyethylene, polybutylene, rubber hydrochloride, polyvinylchloride, polyvinylacetate, polvinylidene chloride and the like; or thermosetting resinous materials in an intermediate stage of polymeric growth such as phenol formaldehyde, urea formaldehyde, melamine formaldehyde, polyesters, furfuryl alcohol resin and the like; or other binder compositions such as asphalt, tar, pitch, glue, shellac or the alcohol insoluble residue of the extract of pine wood pitch (vinsol), or water soluble resins such as the A-stage resins of phenol formaldehyde, urea formaldehyde, melamine formaldehyde, or cellulose ethers and esters such as methylcellulose, carboxymethylcellulose, hydroxyethylcellulose, polyvinyl alcohol, glues and the like.

As little as 1 percent by weight resinous binder may be beneficially used. It is not desirable to exceed 40 or 50 percent by weight under most circumstances, and best use is made when 10–20 percent by weight of the resinous material is present in the fibrous structure.

Fibrous structures prepared of glass fibers in combination with pulp fibers of asbestos or cellulose find excellent use as a polishing cloth. When inorganic loading agents are combined, an excellent scouring cloth is produced. If the fibrous structure with or without a loading agent is further impregnated with wax or the like, its use as a polishing or scouring cloth is more markedly improved.

The following are further examples of compositions of fibrous structures embodying features of this invention.

*Example 10*

65 parts by weight glass wool fibers (0.1–0.5 inch)
3.0 parts by weight phenol formaldehyde resins
5 parts by weight paper pulp The product deposited from an aqueous dispersion has a specific gravity of about 20 pounds per cubic foot.

*Example 11*

38 parts asphalt
100 parts starch
100 parts glass wool
13 parts kraft pulp (7% solids)

The resulting product deposited from a dispersion in 880 gallons of water has an ignition loss of 19.1 percent and a density of 13 pounds per cubic foot.

*Example 12*

77 pounds glass wool fiber
20 pounds asbestos
3 pounds paper pulp

The structure has a specific gravity of about 13 pounds per cubic foot.

*Example 13*

200 pounds glass wool
21 pounds kraft pulp (6%)
2 ounces wetting agent

The ignition loss of the product, deposited from a dispersion diluted to 750 gallons with water, is 7.1 percent and the density 20 pounds per cubic foot.

*Example 14*

70 pounds glass wool fiber
15 pounds asbestos
15 pounds bentonite

The product deposited from an aqueous dispersion has a specific gravity of about 20 pounds per cubic foot.

*Example 15*

80 pounds glass fiber
22.5 pounds asbestos
7.5 pounds dry pulp fiber

Water was added to make up 700 gallons. The ignition loss of the product deposited from a dispersion of 700 gallons in water was 6.0 percent and the density about 11 pounds per cubic foot.

*Example 16*

70 pounds glass fibers
20 pounds phenol formaldehyde resins
5 pounds vinsol
5 pounds newspaper pulp The product deposited together from aqueous dispersion has a specific gravity of 9½ pounds per cubic foot.

Beneficial results are derived by the additional use of dispersing or surface active agents in the slurry in order to maintain the fibers in the desired uniform distribution for fiber formation. Such dispersing agents may be in the form of wetting agents such as quaternary ammonium salts, sodium lauryl sulphates, and other aromatic sulphonates, organic sulphonated ethers such as dioctyl ester of sodium sulpho succinate, sodium alkyl naphthaline sulphonates, and the like. Materials which are not usually considered dispersing agents but which in these particular formulations find exceptional use as dispersing or penetrating agents include tannic acids, iron citrates, gum tragacanth, pectin or the like, or metal chlorides such as aluminum trichloride, stannic chlorides, and the like. The latter materials, such as the tannic acids, citrates and metal chlorides, find most beneficial use in combinations with asbestos pulp as the binding fiber. Instead of such wetting or in combination therewith, foaming agents may also be used in the separation of the beaten fibers. These include such materials as asphalt emulsions and vinsol, pine oil, cresols, and the like. In any event, amounts in the range of 0.1–5.0 percent by weight of wetting agent may be used.

Concepts of this invention may also be practiced with glass fibers which have already been bonded into a fibrous structure with other medium. In that event, the pulp binder fibers function as an additional binding agent and further improve the strength and flexibility characteristics of the product. The difficulty with the after incorporation of the pulp fibers in bonded glass fiber structures resides in the uniform distribution of the pulp fibers into the interior of the fibrous structure. The pulp fibers have a tendency to filter out onto the surface of the web or mass. In order to minimize separation of the pulp fibers on the outer walls of the glass fiber structure and in order to assist penetration thereof into the bonded or unbonded glass fiber structure, materials having the ability of reducing the viscosity of the slurry are used. Generally, the viscosity of the slurry may be varied by giving consideration to the ionic or acidic nature of the slurry. For example, if the slurry is applied to the glass fiber structure within a pH range just below 7, the viscosity is lowered to enhance penetration. It has been found that such fibers may be coagulated after penetration has been achieved by changing the pH to about 7–8.5, such as by the addition or after treatment with solutions of ethylamine or other amines, sodium phosphate or other alkaline substances of like nature. Throwing the slurry further onto the acid side by the addition of stronger acids, such as hydrochloric acid, sulfuric acid, or the like, will also thicken the slurry and flocculate the fiber in position of use.

When such fibers, particularly asbestos fibers, are incorporated in glass fiber mats bonded with organic resins, it is possible to expose the structure to elevated temperatures to burn out the resinous material and still maintain a satisfactory bond because of the binder fibers in the fiber structure.

It has been found further that in the use of an asbestos slurry, bentonites and other corresponding clay materials are able to assist the penetration of the asbestos into the glass fiber structure. Upon heating, orientation between the asbestos and bentonite seems further to improve the bonded nature of the inorganic product. By the use of this technique, bentonite may be incorporated in amounts ranging from 5–50 percent in the product and the product can be exposed to temperatures as high as 1200° F. without change.

Another important concept of this invention resides in the manufacture of a fibrous structure of the type described having particular relation to the use of cellulosic materials as the pulp binder fiber. Considerable improvement in the bonding property of the cellulose fibers is derived by the reaction of the pulp fibers before or after they are associated with the glass fibers in the fibrous structure in a manner to convert at least a part of such fibers to have resinous quality. For such purpose, the cellulosic pulp fibers are gelatinized in whole or in part by conversion partially to a composition of the type which is used in the spinning or rayon and viscose fiber.

In one system, a felt bonded glass fiber structure is formed as previously described and then the wet matted fibers are exposed to chemical reagents by which cellulose is dissolved or gelatinized for rayon manufacture. For example, wetting the fibrous structure with a solution of zinc chloride has the desired effect of gelatinization and partial solution of the cellulose fiber. Copper sulphate and ammonium hydroxide or any ammonium ion may also be used as the medium to provide reactions of the type desired. Carbon disulphide and sodium sulphate, such as employed in the viscose process, is also suitable for the partial gelatinization of the cellulosic pulp fibers. Before all of the cellulose fibers have gelled and after the gelled portions of the fibers have combined with one another so as to bind the glass fibers therebetween, further gelatinization or solution is stopped by removal of the chemical reagents, such as by washing out the solvation chemicals or by introducing a coagulated solution, such as dilute sulfuric acid, sodium sulphate solution, zinc sulphate solution, or the like.

In another system embodying the concepts described, the gelatinization or solvation chemicals, such as cupri-ethylene diamine, or the copper ammonium complex or zinc chloride solution, is introduced into the cellulose pulp slurry before introduction of the glass fibers or before the pulp fibers are incorporated with the glass fibers otherwise deposited. When gelatinization of the pulp fibers has progressed to the desired degree, deposition of the fibrous mixture on a foraminous separating wall is carried out as before and the partially gelled cellulose materials, which are still fibrous in nature, but resinous in their outer surface, deposit with the glass fibers and function more effectively to bind the fibers into an integrated mass. The solvation chemicals, if any remain upon drying, enhance the flame-proofness of the fibrous structure.

By the practice of this system in the manufacture of bonded fibrous structures, still less pulp fibers may be used to achieve equivalent strengths in the end product. Asbestos pulp fibers may be employed in admixture with the glass or cellulose fibers in the manufacture of the fibrous structure but the asbestos fibers, like the glass fibers, are unaffected by the solvation chemicals. By the practice described, it is possible to retain the fibrous character of the binding pulp since it is sufficient if only the surfaces of the fibers are gelled before or after the cellulose fibers are incorporated into the fibrous structure.

*Example 17*

100 grams of bone dry glass wool fiber is gently stirred into four gallons water. Beat 22 grams of kraft pulp and 7.5 grams of fine glass fiber into 100 grams of water. Combine 300 grams of ammonia solution (28% $NH_3$) with 100 grams copper sulphate ($CuSO_4$ $5H_2O$) into 3,000 grams water. In a fourth mixture, combine 400 grams of concentrated sulphuric acid, 240 grams of sodium sulphate ($Na_2SO_4$), and 32 grams of zinc sulphate ($ZnSO_4$) in 4,000 grams of water.

*Procedure.*—Mix the beaten pulp with the dispersion of glass wool fibers and pass the dispersion through a foraminous member to separate out the fibers in a felted layer on the surface while the greater portion of the free water passes therethrough. Thereafter, the layer is soaked for one hour with the ammonia-copper sulphate solution and then the solutions drained off by washing with about five gallons water. The solvation mixture of ammonia and copper sulphate is inactivated by application of the solution formed of concentrated sulphuric acid, sodium sulphate and zinc sulphate. The mass may again be washed with a large amount of water and then dried.

*Example 18*

MATERIALS (a) 85 grams of bone dry glass wool fiber are dispersed in four gallons of water.

(b) 15 grams of kraft paper is pulped in 500 grams water.

(c) 2,000 grams zinc chloride are dissolved in sufficient water to make about one gallon.

*Procedure.*—(b) is dispersed in (a). After about 2½ gallons of water have been removed from the mixture of (a) and (b), (c) is added and the mixture is allowed to stand for about one hour or until the desired degree of gelation of the kraft fibers has been achieved. At this point, the water removed in the previous step or an equivalent amount is added and the mixture poured onto a forming screen for separation of the fibrous materials as a layer thereon while the water drains through. The formed layer is then washed with five or more gallons of water followed by draining and drying.

*Example 19*

MATERIALS (a) 2,000 grams of zinc chloride are dissolved in 2 gallons of water.

(b) Beat 75 grams of cellulose pulp into a uniform dispersion.

(c) Glass fibers arranged in a porous batt.

*Procedure.*—The well fluffed, bone dry glass wool batt is placed between rigid screen members arranged in a holder capable of movement in such fashion as to create a differential pressure between the faces. This may be accomplished by a piston type set-up or by change of air or hydraulic pressure on the fluid head from either side.

(a) and (b) are mixed and allowed to stand from one to three hours. The mixture is applied onto one side of the batt arranged within the holder. The composition is worked back and forth through the batt until the partially gelantinized cellulose has found its way through the fibrous layer. Thereafter the batt is soaked freely in water for the purpose of removing by dilution the zinc salt. A fiber structure having a high degree of mass integrity and considerable strength is produced upon drying. Increased density may be derived by application of pressure for compacting the mass especially during the last stages of the drying process.

The inventive concept which will hereinafter be described is applicable to fibrous structures wherein asbestos type fibers comprise the principal binding medium. It has been found that if the aqueous medium in which the asbestos fibers are dispersed is adjusted by certain acidic compounds, taken alone or in combination, the fibers have a tendency temporarily to deflocculate so that their fibrous character is minimized and the dispersion becomes more fluid. When this character has been imparted to the asbestos pulp fibers, the dispersion is capable of penetrating substantially completely into a fibrous mass without filtration of the asbestos felt fibers onto the surfaces thereof. The acidic nature of the dispersion functions at the same time to impart another beneficial effect in that it makes the glass fiber surfaces more receptive for the bonding agent and the acid reacts with the materials on the glass fiber surface to make available greater surface area to which the pulp fibers might integrate. When the slurry is adjusted to a pH which is varied slightly below neutral, the fibrous character of asbestos is falsified and the slurry becomes very fluid. The pulp fibers may be deflocculated or caused to reappear in their natural form upon increase or decrease of pH by the use of acid or basic substances or use may be made of other known deflocculating agents.

Compounds capable of deflocculation of the type described with asbestos pulp fibers may be selected of organic and inorganic compounds and mixtures thereof, such as tanning acids and their salts represented by tannic acid and its salts, citric acid and its salts and the like; metal chlorides, metal sulphates and metal salts represented by aluminum chloride, magnesium chloride, zinc chloride, ferrous sulphate, chromium nitrate, chromium chloride, chromium sulphate, stannic chloride, ferric chloride and the like; and combinations of such organic acids and their salts with the inorganic metal salts of the type described. Further improvement is achieved by the use of alkylolamines with one or more of the described organic or inorganic acidic substances. Representative of suitable alkylolamines are ethanolamine, di-ethanolamine, tri-ethanolamine and the like.

The concepts described above are particularly well adapted for the incorporation of asbestos fibers into bonded glass fiber products since better penetration to secure uniform distribution of the asbestos fibers amongst the glass fibers may be achieved. Separation of the asbestos onto the glass fiber surfaces may be effected by the techniques previously described or by providing the bonded glass fiber surfaces with a dry coagulating agent or by deflocculating the asbestos slurry after full penetration has been achieved. If desired, such further additions of pulp fibers may be achieved in fibrous structures which have already been formed in accordance with the concepts of this invention earlier described. In this manner the amount of pulp fibers might be increased for the purpose of improving the bonding relation.

By way of further modification, resins such as polyvinylidene chloride, phenol formaldehyde, polyvinyl chloride and the like resins which are unaffected by the acids may be incorporated with the slurry of reduced viscosity. When resinous materials of the type described are incorporated, they may be acetivated at elevated temperatures, such as by ironing the fibrous structure between heated rolls or upon drying and baking at temperatures in the range of 300°–500° F.

Specific examples of various formulations embodying this phase of the invention are as follows:

*Example 20*

| | Grams |
|---|---|
| Calcium aluminate | 5 |
| Asbestos (chrysotile) | 10 |
| Tannic acid | 0.2 |
| Water | 500 |

*Example 21*

| | Grams |
|---|---|
| Asbestos (amosite) | 5 |
| Aluminum sulphate | 1 |
| Magnesium chloride | 0.2 |
| Tannic acid | 0.0 |
| Water | 500 |

*Example 22*

| | Grams |
|---|---|
| Asbestos (chrysotile) | 10 |
| Ethanolamine | 0.4 |
| Tannic acid | 0.2 |
| Water | 500 |

*Example 23*

| | Grams |
|---|---|
| Asbestos (amphobile) | 5 |
| Aluminum chloride | 1 |
| Water | 500 |

*Example 24*

| | Grams |
|---|---|
| Asbestos (1 micron to 1/32″) | 10 |
| Hydrochloric acid solution | 1 |
| Water | 500 |

*Example 25*

| | Grams |
|---|---|
| Asbestos (chrysotile) | 10 |
| Ferric chloride | 1 |
| Chromium nitrate | 0.5 |
| Water | 500 |

The above examples, and particularly Example 20, may be formulated by beating the materials together for about five minutes to form an excellent dispersion in which little, if any, settling takes place. When mixed with glass fibers in the desired proportion and dried in a felted layer, the asbestos pulp fibers deposit over the glass fiber surfaces and form nests at the fiber intersections upon drying to provide an excellent bonding agent.

Applicant has found a number of novel systems which may be employed in the fabrication of bonded fiber structures based upon the principles hereinabove described.

In a preferred system, the deflocculated pulp fibers in admixture with the desired quantity of glass fibers are coagulated or precipitated by coagulating agents just in advance of the separation of the fibers in a separating wall. In this manner excellent distribution of the pulp and glass fibers is secured throughout to provide a uniformly bonded fibrous structure. Very little, if any, fiber passes through and that which does may be returned to the process by reuse of the water or by recirculation. When so deposited very little, if any, fiber is thereafter removed by subsequent applications of wash water.

In a desirable system, glass fibers may be first deposited in layer with a coagulating chemical dried on the surfaces thereof. When the dispersion of reacted asbestos fibers has passed through the glass fiber layer and the asbestos contacts the wetted glass fiber surfaces, the asbestos fibers are coagulated immediately and attach themselves firmly to the glass fiber surfaces.

Fibrous structures of the type produced by the concepts just described, composed almost entirely of inorganic materials, are capable of withstanding temperatures as high as 1200° F. and remain unchanged under direct flame.

It is well known that maximum separation between glass fibers is desired to achieve greatest utility of the glass fiber structure. This permits high flexure of the fiber structure without fear of destruction of the fibers by mutual abrasion. It has been the practice to secure fiber separation of the type described by the use of large amounts of resinous material or by the use of large amounts of loading agents, alone or in combination with the resinous materials.

The use of high concentrations and the proportions of resinous materials is undesirable because of the high cost of such materials and because of the stiffness and inflexibility which such resinous materials naturally impart to the fibrous structure. Loading agents, on the other hand, detract from many of the other properties of the glass fiber structure when present in high concentration.

Applicant has found an entirely new system to achieve separation between fibers in the manner accomplished by the use of large amounts of resin without being handicapped by high cost or loss of desirable properties of the fibrous structure. The desired separation may be achieved more satisfactorily by means which cause the development of a large number of bubbles of microscopic size, especially in the regions adjacent the glass fiber surfaces or in the bonding agent.

It is an object here to improve the quality of glass fiber structures by providing a large number of microscopic bubbles in the fibrous structure to reduce the specific gravity and increase the bulk of the product while reducing the possibility of abrasion between fibers by increasing the distance between them. The presence of such microscopic bubbles between the fibers increases the radius of curvature through which the fiber may bend under conditions of use, and protects the fibers so that force applied at any one point is cushioned and distributed throughout the length of the fiber and to adjacent fibers.

There are a number of techniques which have been developed for accomplishing the desired relation in the fibrous structure.

1. The development of microscopic bubbles in the binder composition can be accomplished by subjecting the binder itself to high temperature, electrical or chemical treatment in such manner as to cause the release of gases from elements therein, or a binder having microscopic bubbles already provided therein may be used for securing the fibers one to another in the mass.

2. Microscopic bubbles may be released from chemical compounds such as from particles of calcium carbonate or other gas forming chemical compounds which may be incorporated as part of the binder or as a loading agent with the fibers during formation of the fibrous structure. The liberation of gas bubbles may be accomplished just before final formation of the fibrous structure, during formation or subsequent to its formation. Liberation of the microscopic gas bubbles in position of use may be accomplished upon exposure of the chemical compound to acidic medium, by heating to relatively high temperature in the range of 500°–1200° F. for a short time, or by ultrasonic or supersonic vibration.

For example, when the chemical compound is in position of use, the structure may be exposed to acid forming gases such as vapors of hydrochloric acid or the like. Instead, it may be incorporated with acid forming compounds such as the metal chlorides of the type aluminum chloride, iron chloride, tin chloride and the like, the acid being formed upon ionization in vapor or water to cause the release of gases in position of use. The use of water vapor is best because the gases then do not have a chance of being washed from the fibrous structure or to dissolve in the aqueous medium. The use of such acidic substances here and in other systems described should be restricted to treatments wherein the glass fibers are resistant to the acidic media or exposed thereto for only short duration.

In carbonate systems and the like employing acidic medium for the liberation of gases, additional resinous and many substances may be used as part of the binding agent, such as carbowax, polyethylene, polystyrene, polyvinylidene chloride, gelatin and the like. Materials such as these are unaffected by acids but will allow the acids to soak through and react with the carbonates to liberate carbon dioxide within the binder system. The calcium oxide or other by-product which remains will serve merely as additional bulking agent.

When acid forming salts are used in the binder agent or mixed salts which form acid upon ionization, it is possible merely to soak the fibrous structure in aqueous medium and allow the moisture to permeate into the fabric and cause the release of gases by reaction of the chemical compound.

*Example 26*

About 3 parts by weight calcium carbonate is milled into a binder formed of 10 parts by weight gelatin and 20 parts by weight carbowax. The binder is formed into a dispersion which may be incorporated into a slurry of pulp binder fibers or used alone to form the binding agent in the formation of a glass fiber structure. After the fibrous structure has dried, the fibrous structure may be treated with an acid solution which permeates into the binder and evolves carbon dioxide as small microscopic bubbles that remains entrapped within the binder or fibrous structure.

*Example 27*

| | Percent |
|---|---|
| Carbon dioxide | 4 |
| Carbowax | 40 |
| Gelatin | 35 |
| Colloidal kaolin | 21 |

A dispersion of the above is incorporated with a slurry of newsprint and precipitated with glass fibers mixed therein upon a foraminous belt. The wet fibrous structure is exposed to vapors of hydrochloric acid which cause the release of carbon dioxide gas in the product. The fibers so treated may be dyed or a pigment may be employed as an ingredient with the binder. Instead of kaolin, other additives may be used such as talc, silica, bentonite, zinc oxide, titanium oxide, decalite, powder glass and the like.

3. Gases absorbed or otherwise present in the diluent, such as dissolved gases in the slurry may be freed to form microscopic bubbles in the formed fibrous structure by heat treatment or by ultrasonic vibration. For this purpose it is possible to dissolve gases in the slurry which are highly soluble therein under normal conditions or under positive pressure. Representative are ammonia, carbon dioxide, sulphur dioxide and the like. Usually temperatures in excess of 400° F. are best for releasing the gases in situ on the glass fiber surfaces where they may be entrapped with the binder composition. Release of gases in position of use may be further aided by subjecting the fibrous structure to reduced atmosphere.

4. Gases may be caused to be adsorbed in large quantity on the surface of certain substances incorporated or forming a part of the bonding agent and these may be released in position of use by thermal treatment or by supersonic or ultrasonic vibration.

Ingredients capable of having gases dissolved thereon for release in the fibrous structure and which may themselves find desirable use in the structure include the loading agents in colloidal form represented by talc, silica, kaolin, bentonite, titanium oxide, diatomaceous earth, wood flour, powdered glass fiber and the like. These may be dispersed in the slurry of pulp fibers as earlier described. The liberated gases cause foaming of the resinous materials if employed, or else remain entrapped with the pulp fibers which serve as a bonding agent and cause the desired separation and spacing between the glass fibers at their intersections.

5. The binding agent may be formulated with a plasticizer or diluent which is not removed under normal treatment for drying the formed fibrous mass. However, upon subsequent treatment under more rigid conditions the lower boiling diluent or plasticizer may be released as vapor which forms as small bubbles which may be entrapped in the fibrous structure to cause the desired separation of fibers. Treatment to release the vapor may be in the form of high temperature insufficient to decompose the binder but sufficient to volatilize the lower boiling plasticizer or solvent. Ultrasonic or supersonic vibration may also be used.

6. Highly porous additives may be incorporated with the fibrous materials in forming the fibrous structure. Such additives include expanded perlite and exfoliated vermiculite. These mineral substances beneficially affect the fibrous structure but their incorporation in uniform distribution has been difficult to achieve because of their low specific gravity, as will hereinafter be pointed out.

When temperature is employed for the purpose of liberating the gaseous medium to form bubbles, it is possible in structures of the type described to employ temperatures in excess of 1000° F. whereby gaseous liberation can be achieved at a desirable rapid rate. Temperatures such as these cannot be used in the organic systems heretofore employed.

In a new and novel system microscopic air bubbles may be incorporated directly into the fibrous structure in forming. As illustrated in Figure 5, water is recirculated through tank 71 from an inlet pipe 72 at the front end to an outlet 73 at the opposite end. Glass wool fibers 74 and the binder pulp 75 is fed into the tank at the front end. The fibers naturally fall enmass towards the bottom of the tank. Just before the fibers reach the bottom, very fine air bubbles 76 are introduced from the underside by injection of air under high pressure through a microporous screen 77 located in the bottom wall 78 of the tank.

As the bubbles 76 rise up into the fibrous mixture, such agitation is maintained by mixers 28 and the rising bubbles as will cause the bubbles to become entrapped in the fibrous mass. The buoyancy added by the bubbles will cause the fibrous mass to rise to the surface where it can be picked up by a conveyor belt 79 which lifts the fibers as a felted layer 80 out of the tank and over a suction box or drying equipment or both, as previously described.

Instead of introducing the microscopic air bubbles through a screen, it may be more practical to embody a flotation system wherein microscopic air bubbles are introduced into the lower portion of the tank intermediate its ends by formation and actuation of a paddle wheel located alongside the tank as shown in Figure 8. Air is pumped through an annular opening 82 about the driving shaft 83 and broken down into a froth or bubbles by reaction with the turning blades 84 of the wheel. The shaft is driven by a pulley 85 connected to a driving motor 86 by a belt 87. The froth or microscopic bubbles seem to attach themselves onto the fibers 88 introduced into the tank as described in connection with Figure 5 whereby the pulp and glass fibers rise as a formed fibrous structure with the fibers in the desired arrangement where they are continuously removed as a formed web for further processing.

The concepts of mineral flotation are particularly well adapted in the practice of this phase of the invention, especially when it is desired to manufacture a fibrous structure of low density. Depending upon the particular composition of the dispersed fibers, frothers, promoters, depressants, activators, sulphidizers and regulators may be employed as in flotation systems. The sulphidizer, such as phosphorous pentasulphide, sodium sulfide and the xanthates, function to provide a sulphide coating on the oxide surfaces of the glass fibers to render them more receptive to attachment of bubbles. The collectors and promoters, such as alkaline metal salts, function to collect into aggregates the fibers and attach the fibers to the bubble. The frothing agent, such as pine oil, higher alcohols, coal tar creosotes and the like, lowers the surface tension of the liquid and supplies the bubble essential for attachment and rise of the fibers. The regulator, which is an alkaline substance such as lime, or an acid such as sulphuric acid, operates to adjust the the hydrogen ion concentration to that which is most suitable for the process.

Without squeezing, fibrous products having densities lower than five pounds per cubic foot may be produced. It appears that the pulp fibers of asbestos or cellulose, when used, orient themselves about the surfaces of the bubbles with the result that a structure having greatly improved characteristics is secured.

More important is a system which makes possible the incorporation of expanded inorganic minerals of the type perlite and vermiculite as loading agents in fibrous structures of the type described. Although it is possible to mix expanded perlite in glass fiber mixtures having little water, the uniform incorporation of such expanded minerals with glass fibers has been difficult to achieve in a highly diluted water system because such minerals naturally flow to the surface whereas the fibrous materials generally separate and flow towards the bottom of the aqueous system. By the use of the foaming agents such as the injection of air in the manner described through the bottom wall of the tank, the fibrous mass may be caused to rise to the surface as rapidly as the expanded perlite or vermiculite. The fibrous materials may become uniformly mixed with such expanded materials at the surface so that they may be led off together as a continuous fibrous layer from the surface of the tank for subsequent treatment as by compression or drying to form a fibrous layer.

Applicant has found that the concepts of ultrasonic or supersonic vibration may be advantageously employed in the various concepts of this invention. For example, the possible variations of vibrations from a high rate to a relatively low rate in the supersonic or ultrasonic range may have the effect in one instance of deflocculating the pulp fibers in the manner achieved by the use of metal chlorides and tannic acids with asbestos or by the use of metal chlorides and pulp fibers. At the point where the fibers are about to settle upon the separating screen, the supersonic effect may be changed to cause deflocculation of the fibrous materials so that they settle out together in the desired arrangement with the glass fibers in the formation of desired fibrous structures.

The supersonic or ultrasonic vibration principles may also be employed in the techniques for liberating gas bubbles during fabric formation so that the bubbles will remain and separate the fibers one from another. Bubble separation may be achieved by supersonic vibration of the aqueous medium in which gases have been absorbed in high concentration or from the surfaces of the particles in which such gases have been absorbed. Supersonic vibration may also be employed in the carbonate system either to impart acidic environment to the fiber forming composition whereby carbon dioxide is liberated from the corresponding carbonate or else supersonic vibration may be employed to provide high temperature which causes carbon dioxide and like gasses to be released from chemical compositions in which they form a part. The possibility of causing heat to be generated by supersonic vibration might also be adapted for the formation of vapors by vaporization of solvent or aqueous medium associated with the mat of the glass fiber structure.

I have found that the concepts of this invention may be employed in a new and novel method for manufacturing pipe covering or like insulation products. As shown in Figures 6 and 7, pipe covering may be prepared by lowering a foraminous mandrel 90 into a tank 91 containing a dispersion 92 of glass fibers and pulp fibers of the type described. The mandrel is supported from the cover 93. One end is fitted with a block connected for imparting rotational movement while the other end has a coupling 94 connected through an adapter 95 to suction means so as to enable the suction throughout the length of the mandrel while being rotated. A felted layer of glass and pulp fibers form on the outer wall of the mandrel while the water is sucked therethrough to provide a well integrated fibrous structure capable of sufficient mass integrity and strength independent of any additions of binder which might be made.

When the desired build up of felted fibers has been achieved on the outer wall of the mandrel, it may be removed with its cover from the fiber dispersion and the fibrous structure 96 stripped from the mandrel. Removal may be effected before drying but it is best to accomplish this after drying since the dried product maintains substantially permanent shape, and hot air can be drawn through the structure while it is on the mandrel to accelerate drying as has been previously pointed out. When dried, sufficient shrinkage takes place to enable the formed fibrous tube to be stripped endwise from the mandrel. It is preferred, however, to wrap the formed fibrous layer with a piece of cloth and then cut through the layer lengthwise to enable the fibrous structure to be opened and stripped from the mandrel or the formed fibrous tube may be cut into semi-circular sections, as shown in Figure 7, to enable removal.

It has been found that under certain circumstances, glass fibers may be made to function in a manner somewhat similar to the asbestos or cellulose pulp fibers for bonding other longer glass fibers into a fibrous structure. Glass fibers ground so fine as to appear as a powder to the naked eye have been found to still be fibrous in nature under the electron microscope and when in such finely divided form, they have some of the clinging effect characteristic of the pulp fibers heretofore described. Such fine glass fibers appear to have a dimension of about 1 to 10 ten thousandths of an inch or less. Thus glass fibers pulped and ground to finely divided form may be used in the techniques described to bond glass fibers of longer length into fibrous structures. This is considered to be an important advance in the technology of glass fibers and fibrous structures. It makes available for the first time a complete felted glass fiber fabric which does not require other substances to impart strength and integrity thereto.

It will be manifest from the description that I have provided a number of concepts which may be used in the manufacture of new and improved fibrous structure, capable of many new uses and adapted to function better in many applications already developed for glass fiber products. The product of this invention is not subject to the limitations imposed by the presence of large quantities of organic material but may be used successfully in applications wherein the product will be subjected to temperatures in excess of 500° F. or even where it might be exposed to direct flame. From a practical standpoint, importance resides also in the economy of manufacture of the types described because fiber which does not separate to form the structure is not lost but may be returned with the water to form fibrous suspensions.

The product of this invention is a highly porous product which has exceptional flexural strength and flexibility and may be varied from a board of high density and strength to a porous insulation product.

It will be understood that numerous changes may be made in materials, composition and apparatus without departing from the spirit of the invention, especially as defined in the following claims.

I claim:

1. The method of producing a fibrous structure comprising forming a layer of glass fibers, subjecting a slurry of cellulose pulp fibers to reaction with a solvation compound contained in solution in the slurry, continuing the solvation of the cellulose until the surfaces of the pulp fibers are partially gelatinized, working the slurry of partially gelatinized pulp fibers through the layer of glass fibers substantially completely to impregnate the layer of glass fibers, and then drying the fibrous mass.

2. The method as claimed in claim 1 in which the slurry of partially gelatinized pulp fibers is worked back and forth through the layer of glass fibers to achieve substantially uniform impregnation.

3. The method of producing a fibrous structure as claimed in claim 1 in which the pulp fibers are present in the fibrous structure in the ratio of 3–15 parts by weight of pulp fibers to 97–85 parts by weight of the glass fibers.

4. The method as claimed in claim 1 in which the solvation compound is selected from the group consisting of cupri-ethylene diamine, copper ammonium complex, and zinc chloride.

5. The method as claimed in claim 1 which includes the additional step of compacting the formed layer during the drying step for producing a product of higher density.

References Cited in the file of this patent

UNITED STATES PATENTS

| | | |
|---|---|---|
| 1,500,207 | Shaw | July 8, 1924 |
| 1,532,083 | Shaw | Mar. 31, 1925 |
| 1,748,998 | Richter | Mar. 4, 1930 |
| 1,887,726 | Weber | Nov. 15, 1932 |
| 1,919,697 | Groff | July 25, 1933 |
| 1,921,504 | Chase et al. | Aug. 8, 1933 |
| 2,002,106 | Bodmer | May 21, 1935 |
| 2,008,141 | McClellan | July 16, 1935 |
| 2,055,446 | Powell | Sept. 22, 1936 |
| 2,080,077 | Howard et al. | May 11, 1937 |
| 2,083,132 | Williams et al. | June 8, 1937 |
| 2,098,775 | Goencz | Nov. 9, 1937 |
| 2,134,340 | Plummer | Oct. 25, 1938 |
| 2,152,901 | Manning | Apr. 4, 1939 |
| 2,156,308 | Schuh | May 2, 1939 |
| 2,159,638 | Schur | May 23, 1939 |
| 2,184,316 | Plummer | Dec. 26, 1939 |
| 2,189,840 | Simison et al. | Feb. 13, 1940 |
| 2,286,968 | Landt | June 16, 1942 |
| 2,300,137 | Salisbury | Oct. 27, 1942 |
| 2,312,776 | Rankin | Mar. 2, 1943 |
| 2,316,998 | Smith | Apr. 20, 1943 |
| 2,365,331 | Carter | Dec. 19, 1944 |
| 2,388,060 | Hicks | Oct. 30, 1945 |
| 2,388,187 | Salle | Oct. 30, 1945 |
| 2,414,833 | Osborne | Jan. 28, 1947 |
| 2,422,345 | Easterberg et al. | June 17, 1947 |
| 2,433,193 | Bechtner | Dec. 23, 1947 |
| 2,477,000 | Osborne | July 26, 1949 |
| 2,489,242 | Slayter et al. | Nov. 22, 1949 |
| 2,493,604 | Walters | Jan. 3, 1950 |
| 2,504,744 | Sproull et al. | Apr. 18, 1950 |
| 2,515,113 | Chaplin | July 11, 1950 |
| 2,528,793 | Secrist | Nov. 7, 1950 |
| 2,581,069 | Bertolet | Jan. 1, 1952 |

OTHER REFERENCES

Collins Paper Industry and Paper World, June 1943, pp. 263–269.